United States Patent [19]

Matsuoka et al.

[11] Patent Number: 5,123,631
[45] Date of Patent: Jun. 23, 1992

[54] METHOD OF AND APPARATUS FOR CONTINUOUSLY DISCHARGING MOLTEN METAL AND SLAG

[75] Inventors: Toshio Matsuoka; Yukio Koyabu; Shinichi Kurozu, all of Niihama, Japan

[73] Assignee: Sumitomo Heavy Industries, Ltd., Tokyo, Japan

[21] Appl. No.: 614,481

[22] Filed: Nov. 16, 1990

[30] Foreign Application Priority Data

Nov. 25, 1989 [JP] Japan .................................. 1-305740

[51] Int. Cl.$^5$ ............................................ B22D 41/01
[52] U.S. Cl. ...................... 266/45; 222/593; 266/239; 266/238
[58] Field of Search ............ 266/44, 45, 230, 236, 266/238, 239; 222/593

[56] References Cited

U.S. PATENT DOCUMENTS 3,904,180  9/1975  Bass et al. ........................ 266/230
4,475,721  10/1984  Pamart ............................ 266/236

FOREIGN PATENT DOCUMENTS 0160185  11/1985  European Pat. Off. .
969953  12/1950  France .
2297916  8/1976  France .
2347444  11/1977  France .

OTHER PUBLICATIONS

Patent Abstracts of Japan, vol. 12, No. 450 (C-547)[3297] Nov. 25, 1988; JP-A-63 176314 (Sumitomo) 20-07-88.

Primary Examiner—Scott Kastler
Attorney, Agent, or Firm—Armstrong, Nikaido, Marmelstein, Kubovcik & Murray

[57] ABSTRACT

A furnace system including a main furnace for melting and reducing material to form molten metal and slag which are to be continuously discharged therefrom and provided with an outlet port formed in an upper portion of the side wall thereof, and an auxiliary furnace connected to the main furnace and communicating with the interior of the main furnace through the outlet port. The molten metal and the slag are allowed to continuously flow from the main furnace into the auxiliary furnace while maintaining the melt level in the main furnace above the level of the outlet port so as to seal the outlet port. The molten metal and the slag are discharged from the auxiliary furnace at the same rate as the increase in the amount of the molten metal and the slag in the main furnace. The auxiliary furnace may be provided with temperature control device for independently controlling the temperatures of the molten metal and the slag in the auxiliary furnace.

5 Claims, 1 Drawing Sheet

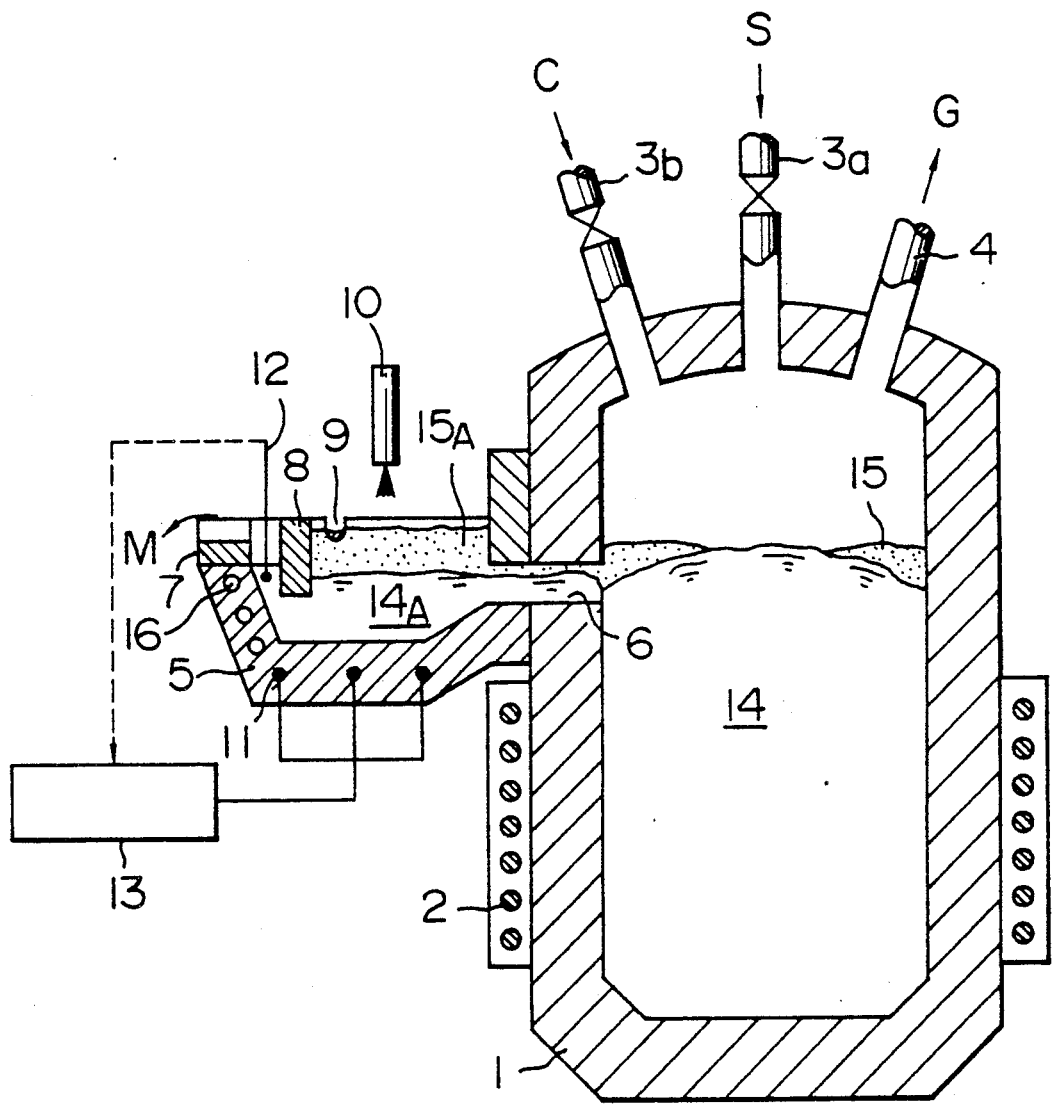

METHOD OF AND APPARATUS FOR CONTINUOUSLY DISCHARGING MOLTEN METAL AND SLAG

BACKGROUND OF THE INVENTION

1. Field of the Invention

The present invention relates to a method of and apparatus for continuously discharging molten metal and slag from a furnace such as an electric induction furnace.

2. Description of the Related Art

Melting furnaces such as electric induction furnaces and arc furnaces have been used in which metals or metal compounds are molten and reduced by high thermal energy of electric heating. Discharge of molten metal and slag from such types of furnace is usually conducted by tilting the furnace or by breaking a bottom plug of the furnace, regardless of the capacity and yield.

The conventional discharging methods are quite dangerous and, hence, require experienced operators of a high level of skill. In addition, the operation of the whole furnace system has to be suspended during discharge.

The suspension of operation not only reduces the productivity but also requires a suitable counter-measure for preventing the temperature of the whole plant from dropping during the suspension.

In the conventional discharging method in which the melt is directly discharged from the furnace at high temperature, if the melt temperature is lowered in order to prevent generation of fumes which occurs when the discharge is conducted at high temperature, the fluidity of the slag is impaired to impede smooth discharge of the molten metal and the slag.

SUMMARY OF THE INVENTION

Accordingly, an object of the present invention is to provide a method of and apparatus for continuously discharging molten metal and slag which can overcome the abovementioned problems of the prior art.

To this end, according to one aspect of the present invention, there is provided a method of continuously discharging molten metal and slag comprising: preparing a furnace system including a main furnace containing the molten metal and the slag and provided with an outlet port formed in an upper portion of the side wall thereof, and an auxiliary furnace connected to the main furnace and communicating with the interior of the main furnace through the outlet port; and allowing the molten metal and the slag to continuously flow from the main furnace into the auxiliary furnace while maintaining the melt level in the main furnace above the level of the outlet port so as to seal the outlet port.

In a preferred form of the invention, the temperatures of the molten metal and the slag in the auxiliary furnace are controlled by temperature control device provided in the auxiliary furnace.

According to another aspect of the present invention, there is provided an apparatus for continuously discharging molten metal and slag comprising: a main furnace containing the molten metal and the slag and provided with an outlet port formed in an upper portion of the side wall thereof; an auxiliary furnace connected to the main furnace and communicating with the interior of the main furnace through the outlet port; and a temperature control heater or a pipe for a temperature control medium provided in the auxiliary furnace.

According to still another aspect of the present invention, there is provided an apparatus for continuously discharging molten metal and slag comprising: a main furnace containing the molten metal and the slag and provided with an outlet port formed in an upper portion of the side wall thereof; an auxiliary furnace connected to the main furnace and communicating with the interior of the main furnace through the outlet port; and a slag heating device provided on the upper side of the auxiliary furnace.

When a pre-treated object containing metals and metal compounds is continuously supplied onto the melt in an electric induction furnace, the object is molten and reduced to form the molten metal and the slag, as well as gaseous components which are discharged to a waste gas treating system outside the furnace. In consequence, the level of the melt in the furnace progressively rises as the amount of the reaction product in the furnace increases. Since the electric induction furnace and the auxiliary furnace are communicated with each other through the outlet port, the melt is allowed to flow through the outlet port and overflows the discharge weir in the auxiliary furnace so as to be discharged externally of the furnace.

The level of the discharge weir is suitably determined according to various factors such as the material to be molten and reduced, static pressure in the furnace, electromagnetic agitation effect and so forth, so that the molten product can continuously be discharged at the same rate as the increase of the product in the furnace, thus maintaining a substantially constant level of the melt in the furnace, without allowing the furnace gas to be blown off through the outlet port. The molten product received by the auxiliary furnace is settled so that slag the molten metal and the slag are separated from each other due to difference in the specific gravity, such that the slag having smaller specific gravity than the molten metal floats on the latter. The temperatures of the molten metal and the slag at which they are discharged can be independently controlled by the temperature controller and the slag heater which are provided in the auxiliary furnace.

The above and other objects, features and advantages of the present invention will become clear from the following description of the preferred embodiment when the same is read in conjunction with the accompanying drawings.

BRIEF DESCRIPTION OF THE DRAWINGS

The accompanying drawing is a vertical sectional view of an apparatus of the present invention for continuously discharging molten metal and slag from a melting furnace.

DESCRIPTION OF THE PREFERRED EMBODIMENT

The preferred embodiment will be described with reference to the sole figure.

An electric induction furnace 1 as a main furnace is provided with an induction heating coil 2 arranged around the lower portion of the side wall thereof. The induction furnace 1 is provided at its top portion with a main material charging port 3a and an auxiliary material charging port 3b, as well as a furnace gas discharge opening 4. An auxiliary furnace 5 communicates with the interior of the electric induction furnace 1 through an outlet port 6 which is formed in the wall of the induction furnace 1 at a level above the mid level of the induction furnace 1 in close proximity of the induction heating coil 2. Thus, molten metal and slag are made to flow from the electric induction furnace 1 into the auxiliary furnace 5 through the outlet port 6 and is allowed to flow out over a discharge weir 7 provided in the auxiliary furnace 5.

The level of the discharge weir 7 is suitably determined according to various factors such as the material to be molten and reduced, static pressure in the furnace, electromagnetic agitation effect and so forth, so that the molten product can continuously be discharged at the same rate as the increase of the product in the furnace, thus maintaining a substantially constant level of the melt in the furnace, without allowing the furnace gas to be blown off through the outlet port 6.

The auxiliary furnace 5 also has a separation weir 8 for separating the molten metal and the slag from each other, and a slag discharging launder which extends in the direction perpendicular to the plane of the cross-section shown in the figure. A gas burner 10 as a slag heating device is disposed above the melt in the auxiliary furnace 5 and is adapted for heating the slag which have been separated from the molten metal. The burner can be operated in accordance with the result of measurement of the slag temperature so as to adjust the fluidity of the slag. The slag heating device, however, may be a pair of electrodes which are immersed in the layer of the slag so as to heat the slag by the heat generated by the electrical resistance of slag.

A melt heating device 11 may include a resistance heater or an electric induction heating coil embedded in the bottom of the auxiliary furnace 5. This melt heating device operates under the control of a controller 13 which in turn operates in response to an output from a thermometer 12 adapted for measuring the melt temperature.

A cooling water pipe 16 may be disposed in the vicinity of the discharge weir 7 so as to cool the molten metal to be discharged, when the melt temperature is still high due to too small dissipation of heat from the melt.

Numerals 14 and 14A denote the molten metal, while 15 and 15A denote the slag floating on the molten metal.

The operation of the induction furnace 1 for melting and reducing the material, as well as the operation for discharging the molten metal and the slag, is conducted in a manner which will be described hereinunder.

The induction furnace 1 is beforehand charged with the material containing the molten metal and the slag which are the same as those to be produced, and the induction coil is energized to heat and melt the material so as to form the molten bath in advance of the start of the operation. In this state, the melt surface is set to a level above the outlet port 6 so as to completely fill the port 6 with the melt.

Then, the treating object S containing metals and metal compounds is continuously charged onto molten metal 14 in the electric induction furnace 1 through the charging port 3a. At the same time, carbonaceous reducing agent and flux such as lime stone and the like for adjusting the basicity are charged onto the molten metal 14 through the charging port 3b. Consequently, the object S is molten and reduced to form the molten metal and the slag, while gaseous products are discharged as exhaust gas G to a waste gas treating system outside the furnace.

The level in the furnace tends to rise in accordance with the increase in the quantity of the reaction products. However, since the induction furnace 1 and the auxiliary furnace 5 are communicated with each other through the outlet port 6, the melt products are introduced into the auxiliary furnace 5 through the outlet port 6 so as to be discharged over the discharge weir 7 in the auxiliary furnace 5. The level of the discharge weir 7 is suitably determined in accordance with factors such as the material to be molten and reduced, static pressure in the furnace and the electromagnetic agitating effect, such that the outlet port 6 is always filled with the liquid product so as to provide a seal against the furnace gas. Consequently, the molten products are discharged to the outside at the same rate as the increase of the quantity of the molten products in the main furnace, thus maintaining a constant melt level in the main furnace, without allowing the furnace gas to blow off through the outlet port 6.

The slag in the molten products is separated by the weir 8 as denoted by 15A. When the rate of generation of the slag is small, the slag 15A stays in the auxiliary furnace for a long time, tending to solidify. In the illustrated embodiment, however, the gas burner 10 heats the slag 15A as required so as to maintain a sufficiently high level of fluidity, thus ensuring a smooth continuous discharge. When the rate of heat dissipation is large to excessively cool molten metal, as in the case where the capacity of the auxiliary furnace 5 is small, the melt heating device 11 is activated to heat the molten metal so as to maintain the required level of the fluidity of the molten metal.

Conversely, when the desired discharge temperature of the molten metal is exceeded due to, for example, a too small dissipation of heat, the molten metal is cooled by the cooling pipe 16 provided in the vicinity of the discharge weir 7.

Consequently, the melt temperature can be adjusted to the desired discharge temperature before the melt overflows the discharge weir 7. For instance, when the metal is pig iron or ferromanganese, the melt temperature can be controlled to 1300° C. or below, thus enabling a smooth and continuous discharge over the discharge weir 7, while avoiding generation of fumes which would occur when the discharge is conducted at higher temperatures.

As will be understood from the foregoing description, the present invention offers the following advantages.

Firstly, the discharge can be conducted without danger even by those who are not so skilled in this kind of work.

Secondly, the discharge can be conducted without requiring suspension of operation of the whole plant, so that the production efficiency is improved. The elimination of suspension of operation also makes unnecessary the temperature preservation of the whole plant and, hence, overcomes any operational difficulty which heretofore has been encountered due to unstable temperature of the plant and variation in the pressure and state of flow at the time of re-start of the plant after completion of the discharge.

Thirdly, the temperature at which the molten metal is discharged can be controlled while the melt is in the auxiliary furnace so that the molten metal can be discharged at a temperature which is low enough to enable a stable discharge and a subsequent casting. For instance, when the metal is pig iron or ferromanganese, the melt temperature can be controlled to 1300° C. or below, thus enabling a smooth and continuous discharge, while avoiding generation of fume which would occur when the discharge is conducted at higher temperatures. This remarkably reduces the load of a dust collector connected to the plant and significantly reduces contamination of the working environment by the noxious substances.

Finally, by suitably selecting the capacity of the auxiliary furnace, the slag/metal reaction time, i.e., the time for the separation of the metallic component and the slag, can be controlled in the auxiliary furnace, thus stabilizing the composition of the discharged melt and considerably increasing the yield of the metal.

While the invention has been particularly shown and described in reference to preferred embodiments thereof, it will be understood by those skilled in the art that changes in form and details may be made therein without departing from the spirit and scope of the invention.

What is claimed is:

1. A method of continuously discharging molten metal and slag comprising the steps of:
    preparing a furnace system including a main furnace containing the molten metal and the slag and provided with an outlet port formed in an upper portion of the side wall thereof, and an auxiliary furnace connected to said main furnace and communicating with the interior of said main furnace through said outlet port;
    allowing said molten metal and said slag to continuously flow from said main furnace into said auxiliary furnace while maintaining melt level of said molten metal and slag in said main furnace above a level of said outlet port so as to continuously seal said outlet port with said molten metal and slag;
    separating said molten metal and said slag from each other in said auxiliary furnace due to the difference between the specific gravities thereof;
    damming up the separated slag by a separation weir provided in said auxiliary furnace to discharge said slag through a discharging launder disposed upstream of said separation weir; and
    leading the separated molten metal to pass under said separation weir to discharge said molten metal over a discharge weir disposed downstream of said separation weir.

2. A method according to claim 1, further comprising the step of controlling, by a temperature control device, the temperatures of said molten metal and said slag in the auxiliary furnace.

3. An apparatus for continuously discharging molten metal and slag comprising:
    a main furnace containing the molten metal and the slag and provided with an outlet port formed in an upper portion of the side wall thereof;
    an auxiliary furnace connected to said main furnace and communicating with the interior of said main furnace through said outlet port;
    a temperature control heater or a pipe for a temperature control medium provided in said auxiliary furnace;
    means for maintaining molten level of said molten metal and slag in said main surface above a level of said outlet port so as to continuously seal said outlet port with said molten metal and slag;
    a separation weir provided in said auxiliary furnace for damming up said slag;
    a discharging launder disposed upstream of said separation weir for discharging the slag dammed up by said separation weir; and
    a discharge weir disposed downstream of said separation weir for discharging the molten metal passing under said separation weir.

4. An apparatus for continuously discharging molten metal and slag comprising:
    a main furnace containing the molten metal and the slag and provided with an outlet port formed in an upper portion of the side wall thereof;
    an auxiliary furnace connected to said main furnace and communicating with the interior of said main furnace through said outlet port;
    a slag heating device provided on the upper side of said auxiliary furnace;
    means for maintaining molten level of said molten metal and slag in said main surface above a level of said outlet port so as to continuously seal said outlet port with said molten metal and slag;
    a separation weir provided in said auxiliary furnace for damming up said slag;
    a discharging launder disposed upstream of said separation weir for discharging the slag dammed up by said separation weir; and
    a discharge weir disposed downstream of said separation weir for discharging the molten metal passing under said separation weir.

5. An apparatus for continuously discharging molten metal and slag comprising:
    a main furnace containing the molten metal and the slag and provided with an outlet port formed in an upper portion of the side wall thereof;
    an auxiliary furnace connected to said main furnace and communicating with the interior of said main furnace through said outlet port;
    a separation weir provided in said auxiliary furnace;
    means for maintaining molten level of said molten metal and slag in said main surface above a level of said outlet port so as to continuously seal said outlet port with said molten metal and slag;
    a separation weir provided in said auxiliary furnace for damming up said slag;
    a discharging launder disposed upstream of said separation weir for discharging the slag dammed up by said separation weir; and
    a discharge weir disposed downstream of said separation weir for discharging the molten metal passing under said separation weir.

* * * * *